US008797314B2

United States Patent
(12) Chung et al.

(10) Patent No.: US 8,797,314 B2
(45) Date of Patent: Aug. 5, 2014

(54) PIXEL CIRCUIT AND ORGANIC ELECTRO-LUMINESCENT DISPLAY APPARATUS

(75) Inventors: Bo-Yong Chung, Yongin (KR); Yong-Sung Park, Yongin (KR); Deok-Young Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 826 days.

(21) Appl. No.: 12/871,818

(22) Filed: Aug. 30, 2010

(65) Prior Publication Data

US 2011/0134100 A1 Jun. 9, 2011

(30) Foreign Application Priority Data

Dec. 8, 2009 (KR) ........................ 10-2009-0121393

(51) Int. Cl.
*G09G 3/30* (2006.01)
*G06F 3/038* (2013.01)

(52) U.S. Cl.
USPC .............. 345/212; 345/76; 345/214; 345/204

(58) Field of Classification Search
USPC ........... 345/76, 77, 78, 79, 80, 81, 82, 83, 44, 345/45, 46, 94, 98, 99, 100, 204–214; 315/169.3, 169.1
See application file for complete search history.

(56) References Cited

U.S. PATENT DOCUMENTS

2007/0040772 A1 2/2007 Kim
2008/0246697 A1* 10/2008 Kim ................................ 345/76
2011/0227885 A1* 9/2011 Chung et al. .................. 345/204
2012/0327142 A1* 12/2012 Kimura ......................... 345/690

FOREIGN PATENT DOCUMENTS

KR 10-0624137 9/2006
KR 10-2007-0015825 A 2/2007
KR 10-0822205 B1 4/2008
KR 100822205 B1 * 4/2008
KR 10-2008-0050113 A 6/2008

OTHER PUBLICATIONS

English Translation of KR100822205, Yang-Wan Kim, Pixel circuit and organic light emitting display devicecomprising the same, Apr. 17, 2008, p. 6.*
KIPO Office action dated Jul. 28, 2011, issued in the priority Korean patent application No. 10-2009-0121393, 5 pps.

* cited by examiner

*Primary Examiner* — Kent Chang
*Assistant Examiner* — Nelson Rosario
(74) *Attorney, Agent, or Firm* — Christie, Parker & Hale, LLP

(57) ABSTRACT

An organic electro-luminescent display apparatus can compensate for the threshold voltage and voltage drop of the driving transistor. The organic electro-luminescent display apparatus divides and drives an initialization time, thereby improving a contrast ratio. The organic electro-luminescent display apparatus minimizes or reduces the change of a current due to a leakage current by correcting the leakage current corresponding to a data voltage with a fixed power source, thereby improving crosstalk. The organic electro-luminescent display apparatus adjusts the duty of the emission control signal, thereby removing or reducing motion blur.

17 Claims, 8 Drawing Sheets

PIXEL CIRCUIT AND ORGANIC ELECTRO-LUMINESCENT DISPLAY APPARATUS

CROSS-REFERENCE TO RELATED APPLICATION(S)

This application claims priority to and the benefit of Korean Patent Application No. 10-2009-0121393, filed on Dec. 8, 2009, in the Korean Intellectual Property Office, the entire content of which is incorporated herein by reference.

BACKGROUND

1. Field

Aspects of embodiments according to the present invention relate to a pixel circuit and an organic electro-luminescent display apparatus.

2. Description of Related Art

A display apparatus applies data driving signals corresponding to input data to a plurality of pixel circuits to control the brightness of each of the pixels and thereby converts the input data into an image to provide to a user. The data driving signals to be outputted to the plurality of pixel circuits are generated by a data driver. The data driver selects a gamma voltage corresponding to the input data from among a plurality of gamma voltages that are generated by a gamma filter circuit and outputs the selected gamma voltage as the data driving signal to the plurality of pixel circuits.

SUMMARY

Embodiments of the present invention provide for a pixel circuit and an organic electro-luminescent display apparatus (e.g., an organic light emitting display device) that can compensate for the threshold voltage and voltage drop of a transistor when driving the organic electro-luminescent display apparatus. Embodiments of the present invention also provide for a pixel circuit and an organic electro-luminescent display apparatus that divide and drive an initialization time, thereby improving a contrast ratio. In addition, embodiments of the present invention provide for a pixel circuit and an organic electro-luminescent display apparatus that reduce or minimize the change of a current due to a leakage current by correcting the leakage current corresponding to a data voltage with a fixed power source, thereby improving crosstalk. Furthermore, embodiments of the present invention provide for a pixel circuit and an organic electro-luminescent display apparatus that adjust the duty of an emission control signal, thereby removing or reducing motion blur.

According to an exemplary embodiment of the present invention, a pixel circuit for driving a light emitting device is provided. The light emitting device includes a first electrode and a second electrode. The pixel circuit includes a driving transistor, second through sixth transistors, and a first capacitor. The driving transistor includes a first electrode and a second electrode, and is configured to output a driving current corresponding to a voltage applied to a gate electrode of the driving transistor. The second transistor is configured to electrically couple the gate electrode and the second electrode of the driving transistor to each other in response to a second scan control signal applied to a gate electrode of the second transistor. The third transistor includes a first electrode configured to receive a data signal. The third transistor is configured to transfer the data signal to a second electrode of the third transistor in response to the second scan signal. The fourth transistor includes a first electrode coupled to a first power source. The fourth transistor is configured to transfer a voltage from the first power source to the second electrode of the third transistor in response to a second emission control signal. The fifth transistor is coupled in series between the second electrode of the driving transistor and the first electrode of the light emitting device, and is configured to transfer the driving current from the driving transistor to the first electrode of the light emitting device in response to a first emission control signal applied to a gate electrode of the fifth transistor. The sixth transistor is configured to transfer an initialization voltage to the gate electrode of the driving transistor in response to a first scan signal. The first capacitor includes a first electrode coupled to the second electrode of the third transistor and a second electrode of the fourth transistor, and a second electrode coupled to the gate electrode of the driving transistor.

The light emitting device may be an organic light emitting diode (OLED).

The second transistor may include a first electrode coupled to the gate electrode of the driving transistor, and a second electrode coupled to the second electrode of the driving transistor.

The second electrode of the light emitting device may be coupled to a third power source.

The initialization voltage may have substantially the same voltage level as a voltage of the third power source.

The pixel circuit may further include a second capacitor having a first electrode coupled to the second electrode of the first capacitor, and a second electrode coupled to a second power source.

The pixel circuit may further include a second capacitor having a first electrode coupled to the first electrode of the first capacitor, and a second electrode coupled to a second power source.

The first electrode of the driving transistor may be a source electrode, and the second electrode of the driving transistor may be a drain electrode.

The first and second scan signals and the first and second emission control signals may be driven to have a first time period, a second time period, a third time period, and a fourth time period. During the first time period, the first scan signal and the second emission control signal have a first level, and the second scan signal and the first emission control signal have a second level. During the second time period, the data signal is effective for the pixel circuit, the second scan signal has the first level, and the first scan signal and the first and second emission control signals have the second level. During the third time period, the first and second scan signals and the second emission control signal have the second level, and the first emission control signal has the first level. During the fourth time period, the first and second scan signals have the second level, and the first and second emission control signals have the first level. The first level is a level at which the driving transistor and the second to sixth transistors are turned on, and the second level is a level at which the driving transistor and the second to sixth transistors are turned off.

According to another exemplary embodiment of the present invention, an organic electro-luminescent display apparatus is provided. The apparatus includes a plurality of pixels, a scan driver, and a data driver. The scan driver is configured to output first and second scan signals and first and second emission control signals to each of the pixels. The data driver is configured to generate and output data signals to the pixels. Each of the pixels includes an organic light emitting diode (OLED), a driving transistor, second through sixth transistors, and a first capacitor. The OLED includes first and second electrodes. The driving transistor includes a first electrode and a second electrode, and is configured to output a driving current corresponding to a voltage applied to a gate electrode of the driving transistor. The second transistor is configured to electrically couple the gate electrode and the second electrode of the driving transistor to each other in response to a respective one of the second scan signals applied to a gate electrode of the second transistor. The third transistor includes a first electrode configured to receive a data signal. The third transistor is configured to transfer a respective one of the data signals to a second electrode of the third transistor in response to the respective one of the second scan signals. The fourth transistor includes a first electrode coupled to a first power source. The fourth transistor is configured to transfer a voltage from the first power source to the second electrode of the third transistor in response to a respective one of the second emission control signals. The fifth transistor is coupled in series between the second electrode of the driving transistor and the first electrode of the OLED, and is configured to transfer the driving current from the driving transistor to the first electrode of the OLED in response to a respective one of the first emission control signals applied to a gate electrode of the fifth transistor. The sixth transistor is configured to transfer an initialization voltage to the gate electrode of the driving transistor in response to a respective one of the first scan signals. The first capacitor includes a first electrode coupled to the second electrode of the third transistor and a second electrode of the fourth transistor, and a second electrode coupled to the gate electrode of the driving transistor.

The second transistor may include a first electrode coupled to the gate electrode of the driving transistor, and a second electrode coupled to the second electrode of the driving transistor.

The second electrode of the OLED may be coupled to a third power source.

The initialization voltage may have substantially the same voltage level as a voltage of the third power source.

The apparatus may further include a second capacitor having a first electrode coupled to the second electrode of the first capacitor, and a second electrode coupled to a second power source.

The apparatus may further include a second capacitor having a first electrode coupled to the first electrode of the first capacitor, and a second electrode coupled to a second power source.

The first electrode of the driving transistor may be a source electrode, and the second electrode of the driving transistor may be a drain electrode.

The scan driver may be driven to have a first time period, a second time period, a third time period, and a fourth time period. During the first time period, the respective ones of the first scan signals and the second emission control signals have a first level, and the respective ones of the second scan signals and the first emission control signals have a second level. During the second time period, the respective one of the data signals is effective for the respective one of the pixels, the respective one of the second scan signals has a first level, and the respective ones of the first scan signals and the first and second emission control signals have the second level. During the third time period, the respective ones of the first and second scan signals and the second emission control signals have the second level, and the respective one of the first emission control signals has the first level. During the fourth time period, the respective ones of the first and second scan signals have the second level, and the respective ones of the first and second emission control signals have the first level. The first level is a level at which the driving transistor and the second to sixth transistors are turned on, and the second level is a level at which the driving transistor and the second to sixth transistors are turned off.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
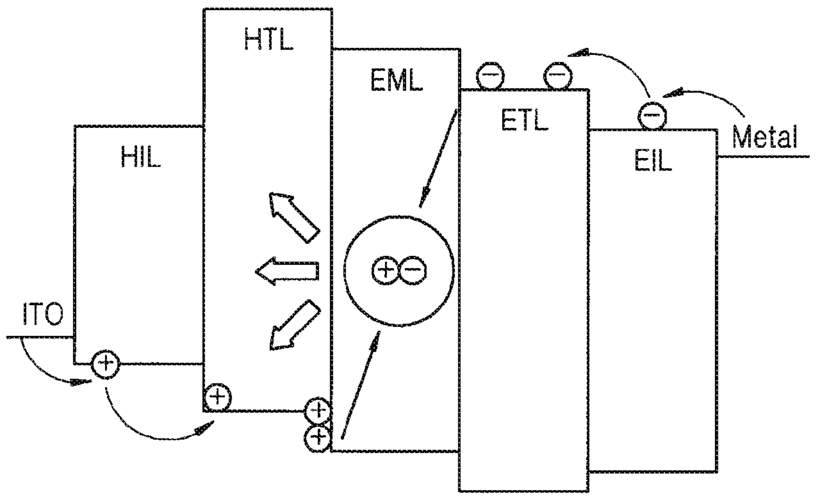
FIG. 1 is a diagram illustrating the emission principle of an organic electro-luminescent diode.

Aspects of the present invention will now be described more fully with reference to the accompanying drawings, in which exemplary embodiments of the invention are shown. The following description and the accompanying drawings are for understanding the operations of aspects of the present invention, and some of the portions that are not required for a complete understanding of the invention have been omitted. Moreover, the specification and the accompanying drawings are provided for the purpose of illustration, not limitation.

In the drawings, like reference numerals refer to like elements throughout. In addition, signal lines and their corresponding signals are labeled similarly throughout, with the appropriate meaning apparent from context. Likewise, power sources and their corresponding voltages are labeled similarly throughout, with the appropriate meaning apparent from context. Further, when an element is referred to as being "coupled to" another element, it can be directly connected to the other element or be indirectly connected to the other element with one or more intervening elements in between.

FIG. 1 is a diagram illustrating the emission principle of an organic electro-luminescent diode.

An organic electro-luminescent display apparatus is a display apparatus that electrically excites a fluorescent organic compound to emit light, and voltage-drives or current-drives organic electro-luminescent devices that are arranged in a matrix to present an image. Each of the organic electro-luminescent devices is typically referred to as an organic light emitting diode (OLED) because it has diode characteristics.

Referring now to FIG. 1, the OLED has a structure in which an anode (ITO), an organic thin film, and a cathode electrode layer (metal) are stacked. For improving emission efficiency by making a good balance between electrons and holes, the organic thin film includes an emitting layer (EML), an Electron Transport Layer (ETL), and a Hole Transport Layer (HTL). In addition, the organic thin film may further include a Hole Injecting Layer (HIL) or an Electron Injecting Layer (EIL).

Figure 2:
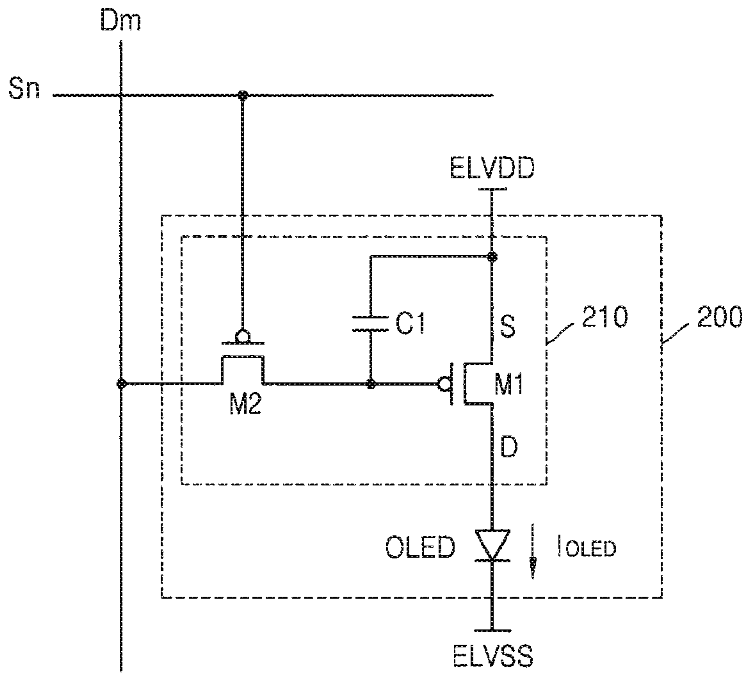
FIG. 2 is a diagram illustrating an exemplary pixel circuit.

FIG. 2 is a diagram illustrating an exemplary pixel circuit.

Referring now to FIG. 2, an organic electro-luminescent display apparatus includes a plurality of pixels 200, each of which includes an OLED and a pixel circuit 210. The OLED receives a driving current $I_{OLED}$ that is outputted from the pixel circuit 210 to emit light, and the brightness of light that is emitted from the OLED varies according to the magnitude of the driving current $I_{OLED}$. The pixel circuit 210 may include a capacitor C1, a driving transistor M1, and a second transistor M2. The driving transistor M1 may include a source electrode coupled to an anode power source ELVDD, a drain electrode coupled to an anode electrode of the OLED, and a gate electrode coupled to a first electrode of the capacitor C1.

When a scan signal Sn from a scan line is applied to a gate electrode of the second transistor M2, a data signal from a data line DM is applied to the gate electrode of the driving transistor M1 and the first electrode of the capacitor C1 through the second transistor M2. While the data signal Dm is being applied, a voltage value corresponding to the data signal Dm is stored in the storage capacitor C1. The driving transistor M1 generates the driving current $I_{OLED}$ according to the value of the data signal Dm and outputs the driving current $I_{OLED}$ to the anode electrode of the OLED. The OLED receives the driving current $I_{OLED}$ from the pixel circuit 210 to emit light having brightness corresponding to the data signal Dm.

In the organic electro-luminescent display apparatus, when the scan signal Sn is applied, initialization is performed and a threshold voltage is compensated. In this case, a contrast ratio may become worse because undesired light is produced while the initialization is being performed, and particularly, it may be difficult to perform the initialization within a short time in the case of a large panel. Embodiments of the present invention provide a pixel circuit for solving or reducing the effects of limitations such as these.

Figure 3:
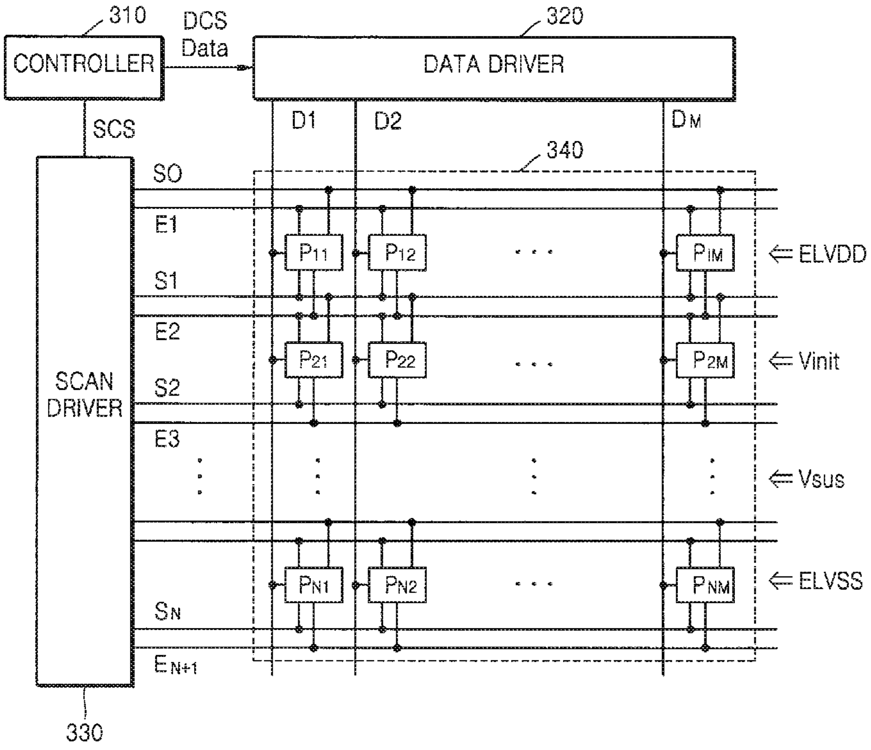
FIG. 3 is a diagram illustrating the structure of an organic electro-luminescent display apparatus according to an embodiment of the present invention.

FIG. 3 is a diagram illustrating the structure of an organic electro-luminescent display apparatus (e.g., an organic light emitting display device) according to an embodiment of the present invention.

Referring now to FIG. 3, an organic electro-luminescent display apparatus according to an embodiment of the present invention includes a controller 310, a data driver 320, a scan driver 330, and a plurality of pixels 340.

The controller 310 generates RGB data and data driver control signals DCS and outputs them to the data driver 320. In addition, the controller 310 generates scan driver control signals SCS and outputs them to the scan driver 330.

The data driver 320 generates the data signals Dm from the RGB data and data driver control signals DCS and outputs the data signals Dm to the pixels 340 through a plurality of data lines D1, D2, . . . , $D_M$. The data driver 320 may generate the data signals Dm from the RGB data using a gamma filter and a digital-to-analog conversion circuit. The data signals Dm may be outputted to respective ones of the plurality of pixels that are located in the same row for one scan period. Moreover, the plurality of data lines D1, D2, . . . , $D_M$ through which the data signals Dm are transferred may be coupled to respective ones of the plurality of pixels that are located in the same column.

The scan driver 330 generates scan signals Sn and emission control signals En from the scan driver control signals SCS and outputs the generated signals to the plurality of pixels 340 through a plurality of scan lines S0, S1, S2, . . . , $S_N$ and a plurality of emission control lines E1, E2, E3, $E_{N+1}$, respectively. The plurality of scan lines S0, S1, S2, $S_N$ through which the scan signals Sn are transferred and the plurality of emission control lines E1, E2, E3, $E_{N+1}$ through which the emission control signals En are transferred may be coupled to respective ones of the plurality of pixels that are located in the same row. The scan signals Sn and the emission control signals En may be sequentially driven in row units (e.g., row by row).

The scan driver 330 according to an embodiment of the present invention may further output a first scan signal Sn−1 through a scan line $S_{N-1}$ for initializing the voltage of gate electrodes of driving transistors of respective ones of the plurality of pixels in row n. The first scan signal Sn−1 is outputted in common to respective ones of the plurality of pixels that are located in the same row (i.e., the nth row), and is sequentially driven in units of rows. The first scan signal Sn−1 is driven before a second scan signal through scan line $S_N$ is driven to the respective ones of the plurality of pixels in row n. According to an embodiment of the present invention, as illustrated in FIG. 3, the first scan signal Sn−1 may be the scan signal of a previous row (i.e., row n−1). For this, the scan driver 330 may output an additional scan signal S0 as an initialization signal for the first row, before a scan signal S1 for the first row is driven.

The scan driver 330 according to an embodiment of the present invention may further output a second emission control signal En+1 through an emission control line $E_{N+1}$, for improving crosstalk by minimizing or reducing the change of a current caused by a leakage current. The second emission control signal En+1 is outputted in common to the respective ones of the plurality of pixels that are located in the same row (i.e., the nth row), and is sequentially driven a row at a time. The second emission control signal En+1 is driven after a first emission control signal En is driven through emission control line. The first emission control signal En is driven to the respective ones of the plurality of pixels in row n. According to an embodiment of the present invention, as illustrated in FIG. 3, the second emission control signal En+1 may be the emission control signal En+1 of a next row (i.e., row n+1). For this, the scan driver 330 may output an additional emission control signal En+1 for improving crosstalk as a termination control signal for the last (Nth) row, after an emission control signal En for the last row is driven.

A plurality of pixels 340, as illustrated in FIG. 3, may be arranged in an N×M matrix. Each pixel Pnm of the pixels 340 may include an OLED and a pixel circuit for driving the OLED. An anode power source voltage ELVDD, an initialization voltage Vinit, a first power source voltage Vsus, and a cathode power source voltage ELVSS may be applied to each of the pixels 340.

Figure 4:
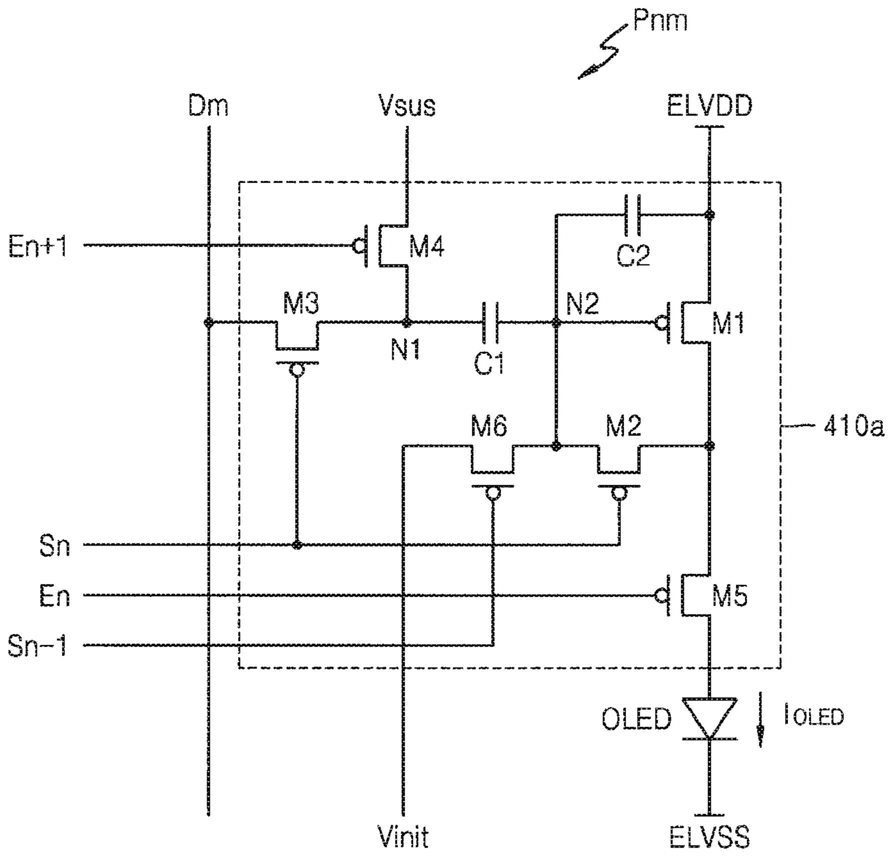
FIG. 4 is a diagram illustrating a pixel circuit according to an embodiment of the present invention.

FIG. 4 is a diagram illustrating a pixel circuit 410*a* according to an embodiment of the present invention.

Referring now to FIG. 4, a pixel Pnm that is located at an nth row, mth column includes the pixel circuit 410*a* and an OLED. The pixel circuit 410*a* receives a data signal Dm from the data driver 320 through a data line DM and outputs a driving current $I_{OLED}$ corresponding to the data signal Dm to the OLED. The OLED emits light having brightness corresponding to the magnitude of the driving current $I_{OLED}$.

The pixel circuit 410*a* in FIG. 4 includes a driving transistor M1, second to sixth transistors M2 to M6, and first and second capacitors C1 and C2. The driving transistor M1 includes a first electrode coupled to an anode power source outputting anode power source voltage ELVDD, a second electrode, and a gate electrode. In some embodiments, the first electrode of the driving transistor M1 is a source electrode while the second electrode is a drain electrode.

The second transistor M2 includes a first electrode coupled to a second node N2, a second electrode coupled to the second electrode of the driving transistor M1, and a gate electrode coupled to a second scan line outputting a second scan signal Sn. The gate electrode and the second electrode of the driving transistor M1 are coupled through the second transistor M2. The second transistor M2 couples the gate electrode and the second electrode of the driving transistor M1 to diode-connect the driving transistor M1, in response to the second scan signal Sn. Herein, diode connection denotes that a transistor operates like a diode by coupling a gate electrode and a first electrode of the transistor or coupling the gate electrode and a second electrode of the transistor.

The third transistor M3 includes a first electrode coupled to the data line, a second electrode coupled to a first node N1, and a gate electrode coupled to the second scan line. The third transistor M3 electrically couples the data line and the first node N1 in response to the second scan signal Sn.

The fourth transistor M4 includes a first electrode coupled to a first power source outputting the first power source voltage Vsus, a second electrode coupled to the first node N1, and a gate electrode coupled to a second emission control line outputting a second emission control signal En+1. The fourth transistor M4 electrically couples the first power source and the first node N1 in response to the second emission control signal En+1.

The fifth transistor M5 includes a first electrode coupled to the second electrode of the driving transistor M1, a second electrode coupled to an anode electrode of the OLED, and a gate electrode coupled to a first emission control line outputting the first emission control En. The fifth transistor M5 is turned on when the first emission control signal En is supplied, but when the first emission control signal En is not supplied, the fifth transistor M5 is turned off.

The sixth transistor M6 includes a first electrode coupled to an initialization power source outputting the initialization voltage Vinit, a second electrode coupled to a second node N2, and a gate electrode coupled to a first scan line outputting the first scan signal Sn−1. The sixth transistor M6 electrically couples the initialization power source Vinit and the second node N2 in response to the first scan signal Sn−1.

The first capacitor C1 includes a first electrode coupled to the first node N1 and a second electrode coupled to the second node N2. The second capacitor C2 includes a first electrode coupled to the second node N2 and a second electrode coupled to an anode power source.

Figure 5:
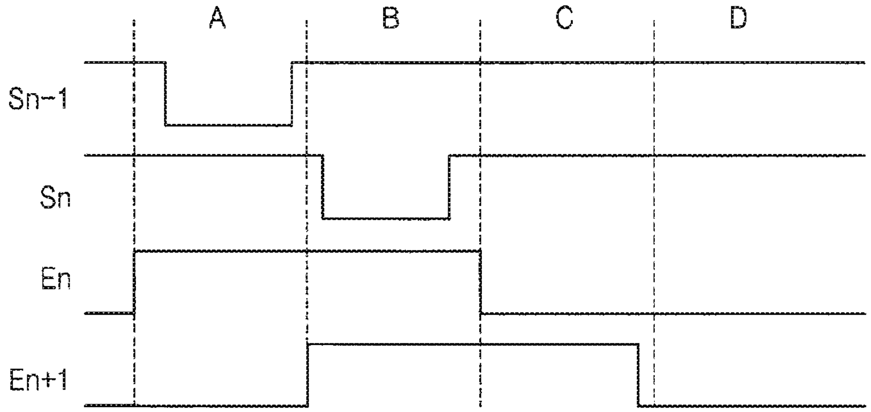
FIG. 5 is a timing diagram of driving signals according to an embodiment of the present invention.

FIG. 5 is a timing diagram of driving signals according to an embodiment of the present invention.

Referring to the driving signals of FIG. 5 for driving the pixel circuit 410*a* of FIG. 4, before a first time period A, a driving current $I_{OLED}$ corresponding to the data signal Dm of a previous frame flows through the OLED and thereby the OLED emits light.

For the first time period A, the first scan signal Sn−1 and the second emission control signal En+1 have a first level, and the second scan signal Sn and the first emission control signal En have a second level. Herein, the first level is one at which the first transistor through the sixth transistor M1 through M6 are turned on, and the second level is one at which the first transistor through the sixth transistor M1 through M6 are turned off. Since the second scan signal Sn and the first emission control signal En have the second level, the second transistor M2, the third transistor M3, and the fifth transistor M5 are turned off. The fourth transistor M4 is turned on in response to the second emission control signal En+1 and thereby, the first node N1 is initialized to the first power source voltage Vsus. In addition, the sixth transistor M6 is turned on in response to the first scan signal Sn−1 and thereby, the second node N2 is initialized to the initialization voltage Vinit. A voltage corresponding to a voltage difference between the initialized first node N1 and the initialized second node N2 is stored in the first capacitor C1. A voltage corresponding to a voltage difference between the anode power source outputting the anode power source voltage ELVDD and the initialized second node N2 is stored in the second capacitor C2.

An initialization signal is divided into the first scan signal Sn−1 and the second emission control signal En+1, and is driven for the first time period A. Thus, the limitations of initialization in a large panel can be overcome by adding the initialization power source outputting initialization voltage Vinit.

For a second time period B, subsequently, the second scan signal Sn has the first level; the first scan signal Sn−1, the first emission control signal En, and the second emission control signal En+1 have the second level; and the data signal Dm is effective for the pixel circuit 410*a*. Since the first scan signal Sn−1, the first emission control signal En, and the second emission control signal En+1 have the second level, the fourth to sixth transistors M4 to M6 are turned off. Since the second scan signal Sn has the first level, the second transistor M2 is turned on in response to the second scan signal Sn and thereby, the driving transistor M1 is diode-connected and a difference between the anode power source voltage ELVDD and a threshold voltage Vth of the driving transistor M1 is applied to the second node N2.

In addition, the third transistor M3 is turned on in response to the second scan signal Sn, and thereby a data voltage Vdata corresponding to the data signal Dm is applied to the first node N1. Accordingly, a voltage equal to a voltage difference between the first and second nodes N1 and N2 is stored in the first capacitor C1, and a voltage equal to a voltage difference between the anode power source and the second node N2 is stored in the second capacitor C2. Consequently, the compensation of the threshold voltage Vth of the driving transistor M1 and the storing of the data signal Dm can be achieved at the same time.

For a third time period C, subsequently, the first emission control signal En has the first level, and the second emission control signal En+1, the first scan signal Sn−1, and the second scan signal Sn have the second level. Since the first scan signal Sn−1, the second scan signal Sn, and the second emission control signal En+1 have the second level, the second transistor M2, the third transistor M3, the fourth transistor M4, and the sixth transistor M6 are turned off. Since the first emission control signal En has the first level, the fifth transistor M5 is turned on in response to the first emission control signal En. Since the first and second nodes N1 and N2 are floated, however, the driving transistor M1 does not operate, and the OLED does not emit light.

For a fourth time period D, subsequently, the first emission control signal En and the second emission control signal En+1 have the first level, and the first scan signal Sn−1 and the second scan signal Sn have the second level. Since the first scan signal Sn−1 and the second scan signal Sn have the second level, the second transistor M2, the third transistor M3, and the sixth transistor M6 are turned off. The fourth transistor M4 is turned on in response to the second emission control signal En+1, and thereby the voltage of the first node N1 is dropped to the first power source voltage Vsus. Since the second node N2 is in a floated state, when the voltage of the first node N1 is dropped, the voltage of the second node N2 is also dropped.

At this point, the second capacitor C2 is charged with a certain voltage in correspondence with a voltage that is applied to the second node N2. Herein, since the magnitude of the voltage drop of the second node N2 is determined by the data voltage Vdata corresponding to the data signal Dm, the charged voltage of the second capacitor C2 is controlled by the data voltage Vdata. The fifth transistor M5 is turned on in response to the first emission control signal En. Then, the driving transistor M1 supplies the driving current $I_{OLED}$, corresponding to a voltage that is applied to the second node N2, to the OLED, and consequently, light having certain brightness is emitted in the OLED.

Herein, since the first node N1 is maintained at the first power source voltage Vsus for the fourth time period D, the change of a leakage current corresponding to the data voltage Vdata (by the third transistor M3) is reduced or minimized, thereby improving crosstalk.

Accordingly, the driving current $I_{OLED}$ that is outputted from the pixel circuit 410*a* according to an embodiment of the present invention is determined irrespective of the voltage of an anode electrode of the OLED, the cathode power source voltage ELVSS, and the threshold voltage Vth of the driving transistor M1. In embodiments of the present invention, consequently, limitations in which the voltage of the data signal Dm should be increased or the image quality is degraded by the change of the magnitude of the driving current $I_{OLED}$ depending on the voltage of the anode electrode of the OLED, can be eliminated or reduced. According to embodiments of the present invention, moreover, limitations in which image quality is degraded by the change of the cathode power source voltage ELVSS can be eliminated or reduced.

Figure 6:
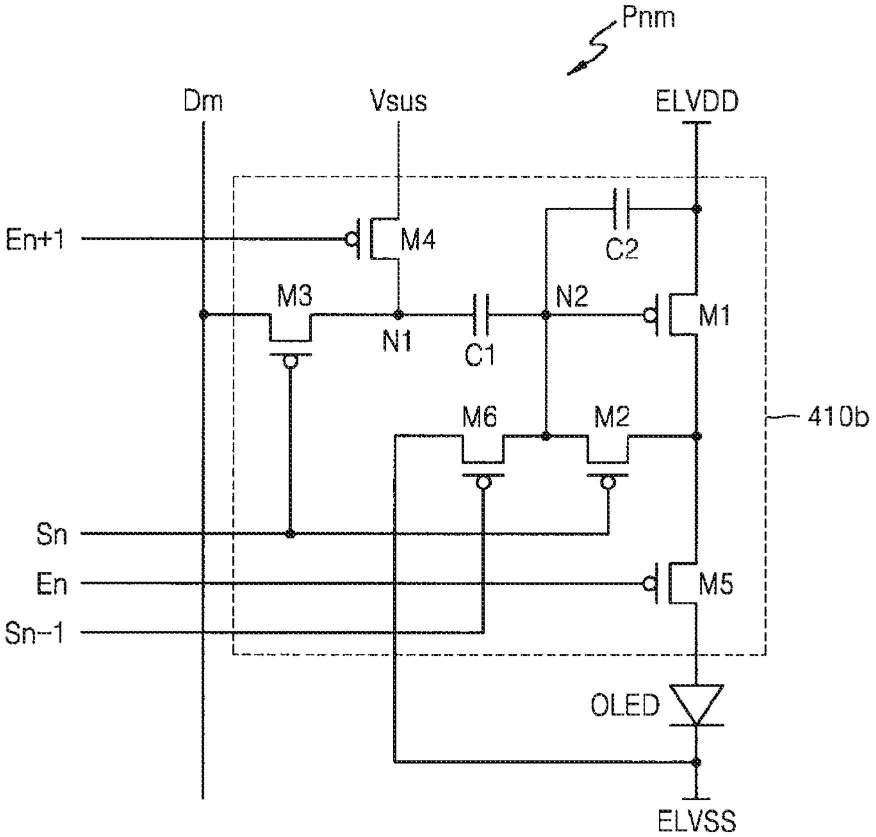
FIG. 6 is a diagram illustrating a pixel circuit according to another embodiment of the present invention.

FIG. 6 is a diagram illustrating a pixel circuit 410*b* according to another embodiment of the present invention.

Referring now to FIG. 6, when compared to the embodiment of FIG. 4, a separate initialization voltage Vinit is not supplied, and the first electrode of the sixth transistor M6 is instead coupled to the cathode power source outputting the cathode power source voltage ELVSS of the OLED. Elements of FIG. 6 that are substantially identical to those of FIG. 4 will not be described again.

Referring to the driving signals of FIG. 5 for driving the pixel circuit 410*b* of FIG. 6, before the first time period A, the driving current $I_{OLED}$ corresponding to the data signal Dm of the previous frame flows through the OLED and thereby the OLED emits light.

For the first time period A, since the second scan signal Sn and the first emission control signal En have the second level, the second transistor M2, the third transistor M3, and the fifth transistor M5 are turned off. The fourth transistor M4 is turned on in response to the second emission control signal En+1, and thereby the first node N1 is initialized to the first power source voltage Vsus. Furthermore, the sixth transistor M6 is turned on in response to the first scan signal Sn−1, and thereby the second node N2 is initialized to the cathode power source voltage ELVSS. A voltage corresponding to a voltage difference between the initialized first node N1 and the initialized second node N2 is stored in the first capacitor C1. A voltage corresponding to a voltage difference between the anode power source outputting the anode power source voltage ELVDD and the initialized second node N2 is stored in the second capacitor C2. Since other operations are the same as operations that have been described above with reference to FIGS. 4 and 5, they will be omitted.

Figure 7:
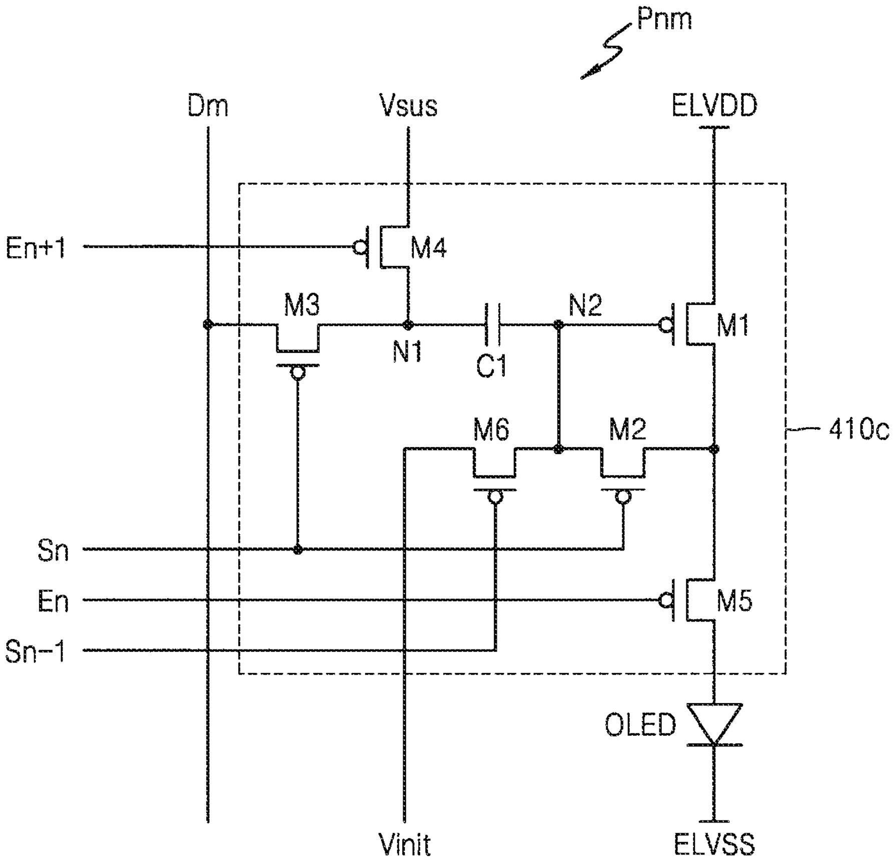
FIG. 7 is a diagram illustrating a pixel circuit according to another embodiment of the present invention.

FIG. 7 is a diagram illustrating a pixel circuit 410*c* according to another embodiment of the present invention.

Referring now to FIG. 7, the pixel circuit 410*c* includes a driving transistor M1, second to sixth transistors M2 to M6, and a first capacitor C1. The driving transistor M1 includes a first electrode coupled to an anode power source outputting the anode power source voltage ELVDD, a second electrode, and a gate electrode. In some embodiments, the first electrode of the driving transistor M1 is a source electrode while the second electrode is a drain electrode.

The second transistor M2 includes a first electrode coupled to a second node N2, a second electrode coupled to the second electrode of the driving transistor M1, and a gate electrode coupled to a second scan line outputting the second scan signal Sn. The gate electrode and the second electrode of the driving transistor M1 are coupled through the second transistor M2. The second transistor M2 couples the gate electrode and the second electrode of the driving transistor M1 to diode-connect the driving transistor M1, in response to the second scan signal Sn.

The third transistor M3 includes a first electrode coupled to a data line Dm, a second electrode coupled to a first node N1, and a gate electrode coupled to the second scan line. The third transistor M3 electrically couples the data line and the first node N1 in response to the second scan signal Sn.

The fourth transistor M4 includes a first electrode coupled to a first power source outputting the first power source voltage Vsus, a second electrode coupled to the first node N1, and a gate electrode coupled to a second emission control line outputting second emission control signal En+1. The fourth transistor M4 electrically couples the first power source and the first node N1 in response to the second emission control signal En+1.

The fifth transistor M5 includes a first electrode coupled to the second electrode of the driving transistor M1, a second electrode coupled to an anode electrode of an OLED, and a gate electrode coupled to a first emission control line outputting first emission control signal En. The fifth transistor M5 is turned on when the first emission control signal En is supplied, but when the first emission control signal En is not supplied, the fifth transistor M5 is turned off.

The sixth transistor M6 includes a first electrode coupled to an initialization power source outputting the initialization voltage Vinit, a second electrode coupled to the second node N2, and a gate electrode coupled to a first scan signal Sn−1. The sixth transistor M6 electrically couples the initialization power source and the second node N2 in response to the first scan signal Sn−1.

The first capacitor C1 includes a first electrode coupled to the first node N1 and a second electrode coupled to the second node N2.

Referring to the driving signals of FIG. 5 for driving the pixel circuit 410*c* of FIG. 7, before a first time period A, a driving current $I_{OLED}$ corresponding to the data signal Dm of a previous frame flows through the OLED and thereby the OLED emits light.

For the first time period A, the first scan signal Sn−1 and the second emission control signal En+1 have the first level, and the second scan signal Sn and the first emission control signal En have the second level. Since the second scan signal Sn and the first emission control signal En have the second level, the second transistor M2, the third transistor M3, and the fifth transistor M5 are turned off. The fourth transistor M4 is turned on in response to the second emission control signal En+1 and thereby, the first node N1 is initialized to the first power source voltage Vsus. In addition, the sixth transistor M6 is turned on in response to the first scan signal Sn−1 and thereby, the second node N2 is initialized to the initialization voltage Vinit. A voltage corresponding to a voltage difference between the initialized first node N1 and the initialized second node N2 is stored in the first capacitor C1.

For a second time period B, subsequently, the second scan signal Sn has the first level; the first scan signal Sn−1, the first emission control signal En, and the second emission control signal En+1 have the second level; and the data signal Dm is effective for the pixel circuit 410*c*. Since the first emission control signal En, the second emission control signal En+1, and the first scan signal Sn−1 have the second level, the fourth to sixth transistors M4 to M6 are turned off. The second transistor M2 is turned on in response to the second scan signal Sn and thereby, the driving transistor M1 is diode-connected and a difference between the anode power source voltage ELVDD and a threshold voltage Vth of the driving transistor M1 is applied to the second node N2.

In addition, the third transistor M3 is turned on in response to the second scan signal Sn, and thereby a data voltage Vdata corresponding to the data signal Dm is applied to the first node N1. Accordingly, a voltage equal to a voltage difference between the first and second nodes N1 and N2 is stored in the first capacitor C1.

For a third time period C, subsequently, the first emission control signal En has the first level, and the second emission control signal En+1, the first scan signal Sn−1, and the second scan signal Sn have the second level. Since the first scan signal Sn−1, the second scan signal Sn, and the second emission control signal En+1 have the second level, the second transistor M2, the third transistor M3, the fourth transistor M4, and the sixth transistor M6 are turned off. The fifth transistor M5 is turned on in response to the first emission control signal En. Since the first and second nodes N1 and N2 are floated, the driving transistor M1 does not operate, and the OLED does not emit light.

For a fourth time period D, subsequently, the first emission control signal En and the second emission control signal En+1 have the first level, and the first scan signal Sn−1 and the second scan signal Sn have the second level. Since the first scan signal Sn−1 and the second scan signal Sn have the second level, the second transistor M2, the third transistor M3, and the sixth transistor M6 are turned off. The fourth transistor M4 is turned on in response to the second emission control signal En+1, and thereby the voltage of the first node N1 is dropped to the first power source voltage Vsus.

Furthermore, since the second node N2 is in a floated state, when the voltage of the first node N1 is dropped, the voltage of the second node N2 is also dropped. The magnitude of the voltage drop of the second node N2 is determined by the data voltage Vdata corresponding to the data signal Dm. The fifth transistor M5 is turned on in response to the first emission control signal En. Then, the driving transistor M1 supplies the driving current $I_{OLED}$, corresponding to a voltage that is applied to the second node N2, to the OLED, and consequently, light having certain brightness is emitted in the OLED.

Figure 8:
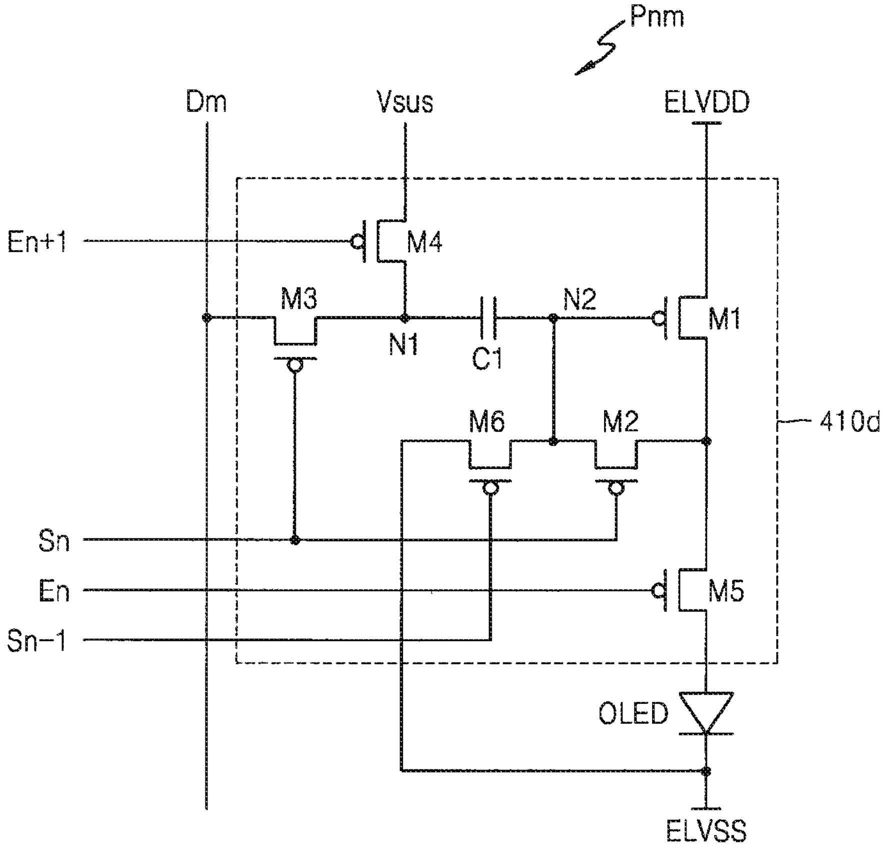
FIG. 8 is a diagram illustrating a pixel circuit according to another embodiment of the present invention.

FIG. 8 is a diagram illustrating a pixel circuit 410*d* according to another embodiment of the present invention.

Referring now to FIG. 8, when compared to the embodiment of FIG. 7, a separate initialization voltage Vinit is not applied, and the first electrode of the sixth transistor M6 is instead coupled to the cathode power source outputting the cathode power source voltage ELVSS of an OLED. The remainder of FIG. 8 is the same as FIG. 7, so will not be described any further.

Referring to the driving signals of FIG. 5 for driving the pixel circuit 410*d* of FIG. 8, before the first time period A, the driving current $I_{OLED}$ corresponding to the data signal Dm of the previous frame flows through the OLED and thereby the OLED emits light.

For the first time period A, since the second scan signal Sn and the first emission control signal En have the second level, the second transistor M2, the third transistor M3, and the fifth transistor M5 are turned off. The fourth transistor M4 is turned on in response to the second emission control signal En+1, and thereby the first node N1 is initialized to the first power source voltage Vsus. Furthermore, the sixth transistor M6 is turned on in response to the first scan signal Sn−1, and thereby the second node N2 is initialized to the cathode power source voltage ELVSS. A voltage corresponding to a voltage difference between the initialized first node N1 and the initialized second node N2 is stored in a first capacitor C1. Since other operations are the same as operations that have been described above with reference to FIGS. 7 and 5, they will be omitted.

Figure 9:
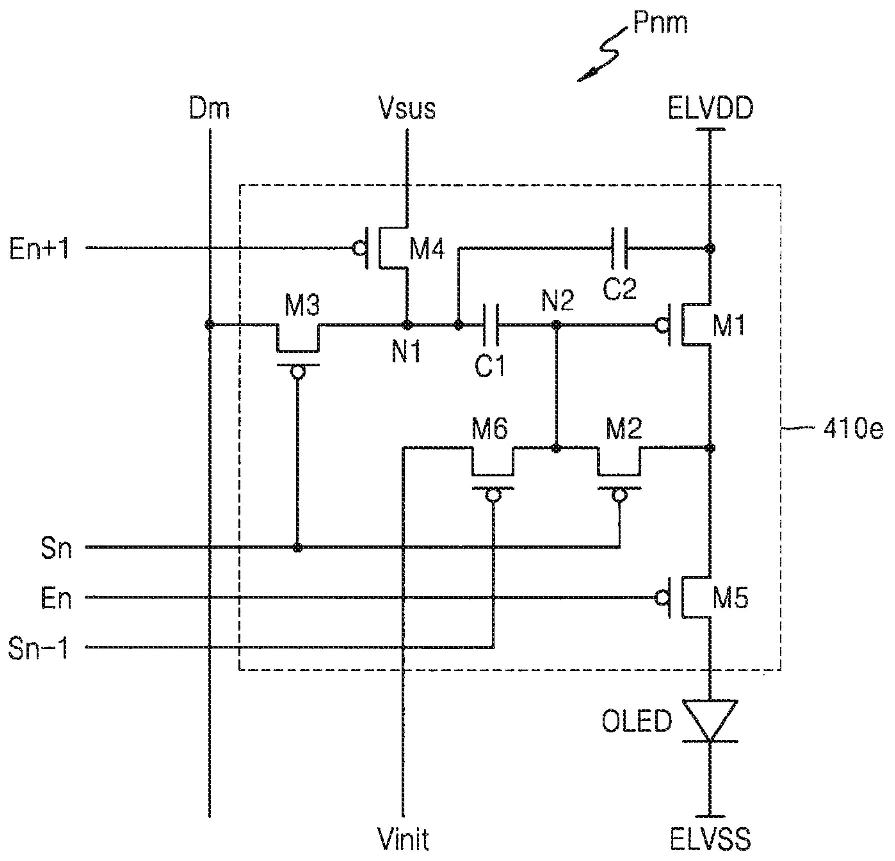
FIG. 9 is a diagram illustrating a pixel circuit according to another embodiment of the present invention.

FIG. 9 is a diagram illustrating a pixel circuit 410*e* according to another embodiment of the present invention.

Comparing with FIG. 4, in the pixel circuit 410*e*, a second capacitor C2 includes a first electrode connected to the first node N1 and a second electrode connected to the anode power source voltage ELVDD, and other elements are the same as those of FIG. 4.

Referring to the driving signals of FIG. 5 for driving the pixel circuit 410*e* of FIG. 9, before a first time period A, a driving current $I_{OLED}$ corresponding to the data signal Dm of a previous frame flows through the OLED and thereby the OLED emits light.

For the first time period A, the first scan signal Sn−1 and the second emission control signal En+1 have the first level, and the second scan signal Sn and the first emission control signal En have the second level. Since the second scan signal Sn and the first emission control signal En have the second level, the second transistor M2, the third transistor M3, and the fifth transistor M5 are turned off. The fourth transistor M4 is turned on in response to the second emission control signal En+1 and thereby, the first node N1 is initialized to the first power source voltage Vsus. In addition, the sixth transistor M6 is turned on in response to the first scan signal Sn−1 and thereby, the second node N2 is initialized to the initialization voltage Vinit. A voltage corresponding to a voltage difference between the initialized first node N1 and the initialized second node N2 is stored in the first capacitor C1. A voltage corresponding to a voltage difference between the anode power source and the initialized first node N1 is stored in the second capacitor C2.

For a second time period B, subsequently, the second scan signal Sn has the first level; the first scan signal Sn−1, the first emission control signal En, and the second emission control signal En+1 have the second level; and the data signal Dm is effective for the pixel circuit 410*e*. Since the first scan signal Sn−1, the first emission control signal En, and the second emission control signal En+1 have the second level, the fourth to sixth transistors M4 to M6 are turned off. The second transistor M2 is turned on in response to the second scan signal Sn, and thereby, the driving transistor M1 is diode-connected and a difference between the anode power source voltage ELVDD and a threshold voltage Vth is applied to the second node N2.

In addition, the third transistor M3 is turned on in response to the second scan signal Sn, and thereby a data voltage Vdata corresponding to the data signal Dm is applied to the first node N1. Accordingly, a voltage equal to a voltage difference between the first and second nodes N1 and N2 is stored in the first capacitor C1, and a voltage equal to difference between the anode power source voltage ELVDD and the first node N1 is stored in the second capacitor C2.

For a third time period C, subsequently, the first emission control signal En has the first level, and the second emission control signal En+1, the first scan signal Sn−1 and the second scan signal Sn have the second level. Since the first scan signal Sn−1, the second scan signal Sn, and the second emission control signal En+1 have the second level, the second transistor M2, the third transistor M3, the fourth transistor M4, and the sixth transistor M6 are turned off. The fifth transistor M5 is turned on in response to the first emission control signal En. Since the first and second nodes N1 and N2 are floated, the driving transistor M1 does not operate, and the OLED does not emit light.

For a fourth time period D, subsequently, the first emission control signal En and the second emission control signal En+1 have the first level, and the first scan signal Sn−1 and the second scan signal Sn have the second level. Since the first scan signal Sn−1 and the second scan signal Sn have the second level, the second transistor M2, the third transistor M3, and the sixth transistor M6 are turned off. The fourth transistor M4 is turned on in response to the second emission control signal En+1, and thereby the voltage of the first node N1 is dropped to the first power source voltage Vsus.

Furthermore, since the second node N2 is in a floated state, when the voltage of the first node N1 is dropped, the voltage of the second node N2 is also dropped. The magnitude of the voltage drop of the second node N2 is determined by the data voltage Vdata corresponding to the data signal Dm. The fifth transistor M5 is turned on in response to the first emission control signal En. Then, the driving transistor M1 supplies the driving current $I_{OLED}$, corresponding to a voltage that is applied to the second node N2, to the OLED, and consequently, light having certain brightness is emitted in the OLED.

Figure 10:
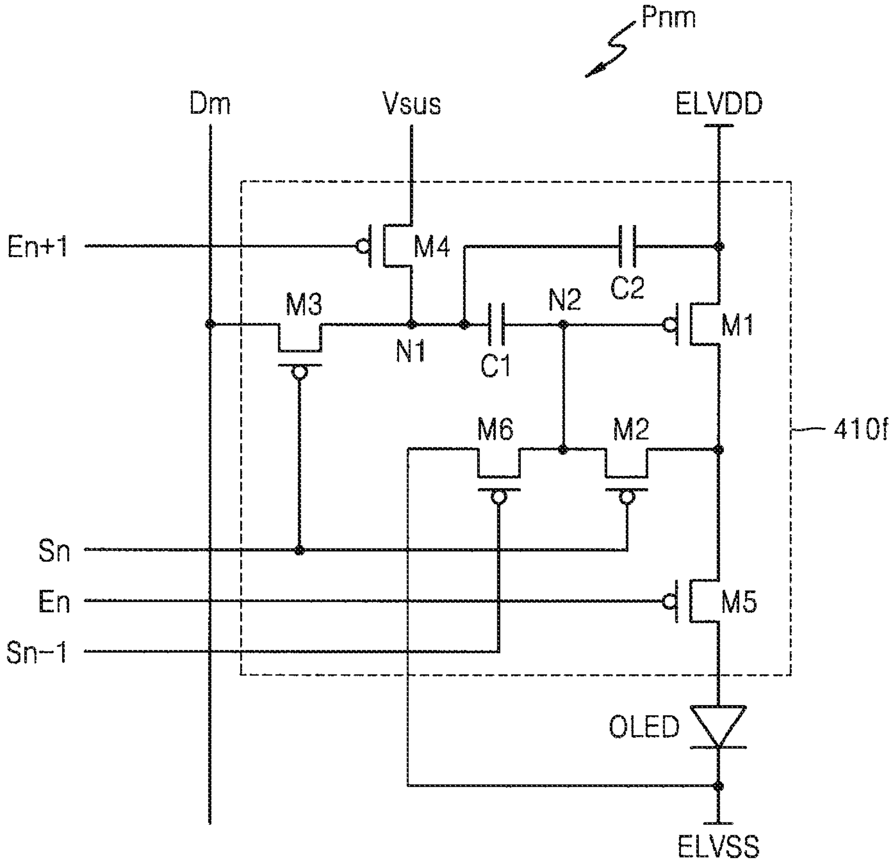
FIG. 10 is a diagram illustrating a pixel circuit according to another embodiment of the present invention.

FIG. 10 is a diagram illustrating a pixel circuit 410*f* according to another embodiment of the present invention.

Referring now to FIG. 10, when compared to the embodiment of FIG. 9, a separate initialization voltage Vinit is not applied, and the first electrode of the sixth transistor M6 is instead coupled to the cathode power source outputting the cathode power source voltage ELVSS of an OLED. The remainder of FIG. 10 is the same as FIG. 9, so will not be described any further.

Referring to the driving signals of FIG. 5 for driving the pixel circuit 410*f* of FIG. 10, before the first time period A, the driving current $I_{OLED}$ corresponding to the data signal Dm of the previous frame flows through the OLED and thereby the OLED emits light.

For the first time period A, since the second scan signal Sn and the first emission control signal En have the second level, the second transistor M2, the third transistor M3 and the fifth transistor M5 are turned off. The fourth transistor M4 is turned on in response to the second emission control signal En+1, and thereby the first node N1 is initialized to the first power source voltage Vsus. Furthermore, the sixth transistor M6 is turned on in response to the first scan signal Sn−1, and thereby the second node N2 is initialized to the cathode power source voltage ELVSS. A voltage corresponding to a voltage difference between the initialized first node N1 and the initialized second node N2 is stored in the first capacitor C1. A voltage corresponding to a voltage difference between an anode power source and the initialized first node N1 is stored in the second capacitor C2. Since other operations are the same as operations that have been described above with reference to FIGS. 9 and 5, they will be omitted.

According to embodiments of the present invention, as described above, the organic electro-luminescent display apparatus can compensate for the threshold voltage and voltage drop of the driving transistor. The organic electro-luminescent display apparatus divides and drives an initialization time, thereby improving a contrast ratio. Moreover, the organic electro-luminescent display apparatus reduces or minimizes the change of a current due to a leakage current by correcting the leakage current corresponding to a data voltage with a fixed power source, thereby improving crosstalk. The organic electro-luminescent display apparatus adjusts the duty of the emission control signal, thereby removing or reducing motion blur.

While aspects of the present invention have been particularly shown and described with reference to exemplary embodiments thereof, it will be understood by those skilled in the art that various changes in form and details may be made therein without departing from the spirit and scope of the appended claims, and equivalents thereof. The exemplary embodiments should be considered in descriptive sense only and not for purposes of limitation.

What is claimed is:

1. A pixel circuit for driving a light emitting device comprising a first electrode and a second electrode, the pixel circuit comprising:

a driving transistor comprising a gate electrode, a first electrode, and a second electrode, the gate electrode of the driving transistor being coupled to a second node, the driving transistor being configured to output a driving current corresponding to a data signal;

a second transistor configured to electrically couple the gate electrode and the second electrode of the driving transistor to each other in response to a current scan signal applied to a gate electrode of the second transistor;

a third transistor comprising a first electrode configured to receive the data signal, the third transistor being configured to transfer the data signal to a first node in response to the current scan signal;

a fourth transistor comprising a first electrode coupled to a first power source, the fourth transistor being configured to transfer a voltage from the first power source to the first node in response to a next emission control signal;

a fifth transistor coupled in series between the second electrode of the driving transistor and the first electrode of the light emitting device, and configured to transfer the driving current from the driving transistor to the first electrode of the light emitting device in response to a current emission control signal;

a sixth transistor configured to transfer an initialization voltage to the second node in response to a previous scan signal; and a first capacitor comprising a first electrode coupled to the first node and a second electrode coupled to the second node, wherein, during an initialization period, the third transistor and the second transistor are configured to be off and the fourth transistor and the sixth transistor are configured to be on to initialize the first node and the second node, respectively, and wherein, during an emission period, the fifth transistor is configured to be on to transfer the driving current to the light emitting device and the fourth transistor is configured to be on to transfer the voltage from the first power source to the first node.

2. The pixel circuit of claim 1, wherein the light emitting device comprises an organic light emitting diode (OLED).

3. The pixel circuit of claim 1, wherein the second transistor comprises a first electrode coupled to the gate electrode of the driving transistor, and a second electrode coupled to the second electrode of the driving transistor.

4. The pixel circuit of claim 1, wherein the second electrode of the light emitting device is coupled to a third power source.

5. The pixel circuit of claim 4, wherein the initialization voltage has substantially the same voltage level as a voltage of the third power source.

6. The pixel circuit of claim 1, further comprising a second capacitor comprising a first electrode coupled to the second electrode of the first capacitor, and a second electrode coupled to a second power source.

7. The pixel circuit of claim 1, further comprising a second capacitor comprising a first electrode coupled to the first electrode of the first capacitor, and a second electrode coupled to a second power source.

8. The pixel circuit of claim 1, wherein:

the first electrode of the driving transistor comprises a source electrode, and the second electrode of the driving transistor comprises a drain electrode.

9. The pixel circuit of claim 1, wherein the previous and current scan signals, and the current and next emission control signals are configured to be driven during a first time period, a second time period, a third time period, and a fourth time period, wherein:

during the first time period, the previous scan signal and the next emission control signal have a first level, and the current scan signal and the current emission control signal have a second level;

during the second time period, the data signal is effective for the pixel circuit, the current scan signal has the first level, and the previous scan signal and the current and next emission control signals have the second level;

during the third time period, the previous and current scan signals and the next emission control signal have the second level, and the current emission control signal has the first level;

during the fourth time period, the previous and current scan signals have the second level, and the current and next emission control signals have the first level; and the first level is a level at which the driving transistor and the second to sixth transistors are turned on, and the second level is a level at which the driving transistor and the second to sixth transistors are turned off.

10. An organic electro-luminescent display apparatus comprising:

a plurality of pixels;

a scan driver configured to output previous and current scan signals, and current and next emission control signals to each of the pixels; and a data driver configured to generate and output data signals to the pixels, wherein each of the pixels comprises:

an organic light emitting diode (OLED) comprising first and second electrodes;

a driving transistor comprising a gate electrode, a first electrode, and a second electrode, and configured to output a driving current corresponding to one of the data signals;

a second transistor configured to electrically couple the gate electrode and the second electrode of the driving transistor to each other in response to a respective one of the current scan signals applied to a gate electrode of the second transistor;

a third transistor comprising a first electrode configured to receive a respective one of the data signals, the third transistor being configured to transfer the respective one of the data signals to a second electrode of the third transistor in response to the respective one of the current scan signals;

a fourth transistor comprising a first electrode coupled to a first power source, the fourth transistor being configured to transfer a voltage from the first power source to the second electrode of the third transistor in response to a respective one of the next emission control signals;

a fifth transistor coupled in series between the second electrode of the driving transistor and the first electrode of the OLED, and configured to transfer the driving current from the driving transistor to the first electrode of the OLED in response to a respective one of the current emission control signals;

a sixth transistor configured to transfer an initialization voltage to the gate electrode of the driving transistor in response to a respective one of the previous scan signals; and a first capacitor comprising a first electrode coupled to the second electrode of the third transistor and a second electrode of the fourth transistor, and a second electrode coupled to the gate electrode of the driving transistor, wherein, during an initialization period, the third transistor and the second transistor are configured to be off and the fourth transistor and the sixth transistor are configured to be on to initialize the first electrode and the second electrode of the first capacitor, respectively, and wherein, during an emission period, the fifth transistor is configured to be on to transfer the driving current to the light emitting device and the fourth transistor is configured to be on to transfer the voltage from the first power source to the first electrode of the first capacitor.

11. The apparatus of claim 10, wherein the second transistor comprises a first electrode coupled to the gate electrode of the driving transistor, and a second electrode coupled to the second electrode of the driving transistor.

12. The apparatus of claim 10, wherein the second electrode of the OLED is coupled to a third power source.

13. The apparatus of claim 12, wherein the initialization voltage has substantially the same voltage level as a voltage of the third power source.

14. The apparatus of claim 10, further comprising a second capacitor comprising a first electrode coupled to the second electrode of the first capacitor, and a second electrode coupled to a second power source.

15. The apparatus of claim 10, further comprising a second capacitor comprising a first electrode coupled to the first electrode of the first capacitor, and a second electrode coupled to a second power source.

16. The apparatus of claim 10, wherein:

the first electrode of the driving transistor comprises a source electrode, and the second electrode of the driving transistor comprises a drain electrode.

17. The apparatus of claim 10, wherein the scan driver is configured to be driven during a first time period, a second time period, a third time period, and a fourth time period, wherein:

during the first time period, the respective ones of the previous scan signals and the next emission control signals have a first level, and the respective ones of the current scan signals and the current emission control signals have a second level, during the second time period, the respective one of the data signals is effective for the respective one of the pixels, the respective one of the current scan signals has a first level, and the respective ones of the previous scan signals and the current and next emission control signals have the second level, during the third time period, the respective ones of the previous and current scan signals and the next emission control signals have the second level, and the respective one of the current emission control signals has the first level, during the fourth time period, the respective ones of the previous and current scan signals have the second level, and the respective ones of the current and next emission control signals have the first level, and the first level is a level at which the driving transistor and the second to sixth transistors are turned on, and the second level is a level at which the driving transistor and the second to sixth transistors are turned off.

* * * * *